B. FORD.
STORAGE BATTERY.
APPLICATION FILED NOV. 5, 1919.
1,367,595.
Patented Feb. 8, 1921.
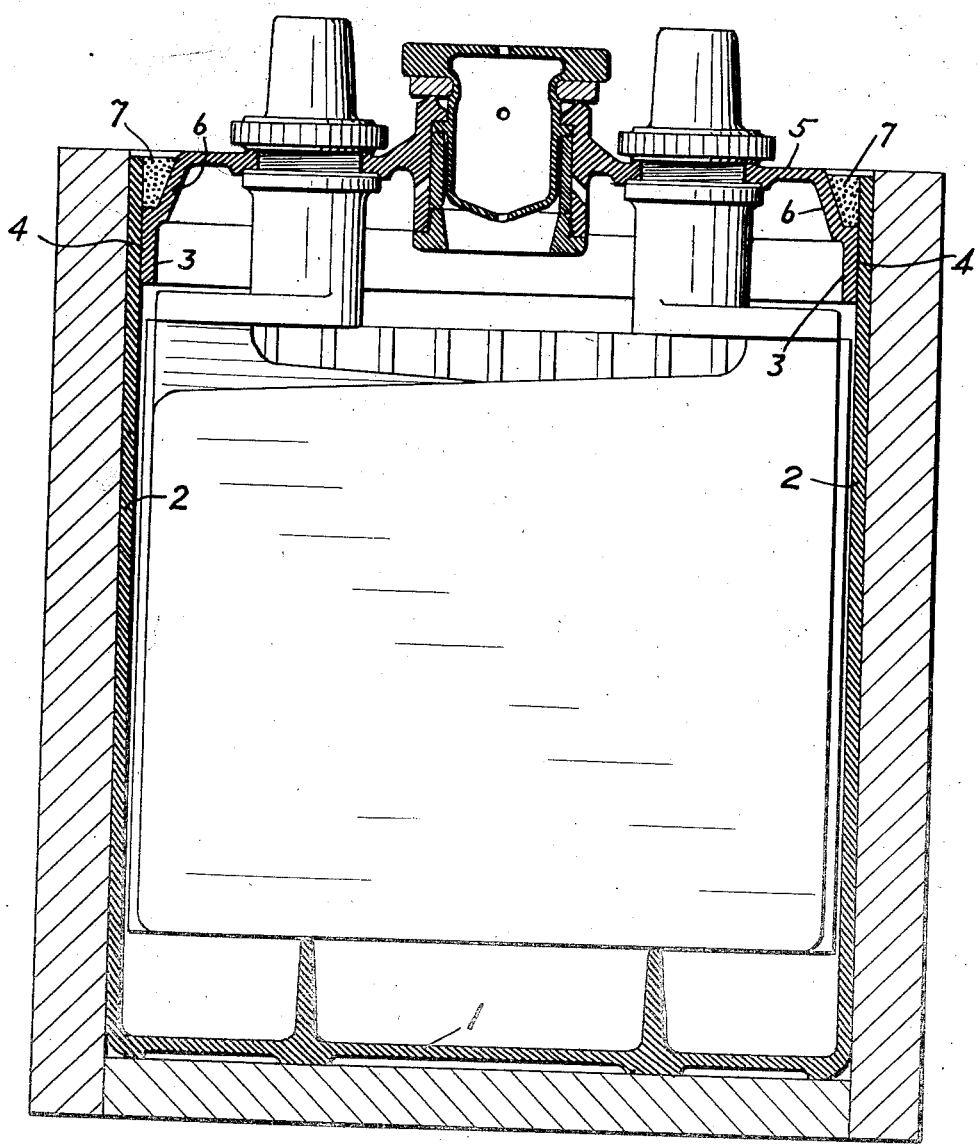
WITNESS:
INVENTOR
Bruce Ford
BY
Augustus B. Stoughton.
ATTORNEY.

UNITED STATES PATENT OFFICE.

BRUCE FORD, OF PHILADELPHIA, PENNSYLVANIA.

STORAGE BATTERY.

1,367,595.  Specification of Letters Patent.  Patented Feb. 8, 1921.

Application filed November 5, 1919. Serial No. 335,818.

*To all whom it may concern:*

Be it known that I, BRUCE FORD, a citizen of the United States, residing at Philadelphia, in the county of Philadelphia and State of Pennsylvania, have invented certain new and useful Improvements in Storage Batteries, of which the following is a specification.

The principal objects of the present invention are to keep the cover from warping and to prevent the sealing compound, when softened, from running into the jar.

Other objects of the invention will appear from the following description and the invention will be claimed at the end hereof.

In the following explanation reference will be made to the accompanying drawings forming part hereof and in which there is illustrated principally in section a storage battery embodying features of the invention.

In the drawings 1, is a storage battery jar having flat internal walls 2, and usually it is rectangular in cross-section. 3, is a hollow frame shown as rectangular and adapted to fit into the jar and having a flat exterior wall 4, extending parallel to and in facial contact with the inner jar wall. 5, is a cover plate of less area than the frame 3, and it is provided with a marginal flange or neck 6, extending to and joining the frame 3, and providing a sealing channel 7, closed by the facial contact of the frame and jar walls.

In addition to the function of closing the sealing channel 7, and opposing passage of the sealing compound when melted by heat, as has been referred to, the frame or skirt 3, by affording ample bearing surface for the cover on the inside wall of the jar, tends to keep the cover from warping.

I claim:

1. A cover for a storage battery container consisting of a cover-plate having a rectangular frame or skirt spaced beyond its edge and provided with a flat exterior and interior wall perpendicular to the plane of the cover, and said plate having a marginal flange or neck flaring to and joining the frame and providing a sealing channel.

2. A storage battery container comprising in combination an internally rectangular storage battery jar having flat inner walls, a rectangular hollow frame adapted to fit into the jar and having a flat exterior wall extending parallel to and in facial contact with the inner jar wall, a cover plate of less area than the frame, and a marginal flange on the frame and providing a sealing channel closed by the facial contact of the frame and jar walls, substantially as described.

3. A storage battery container comprising in combination a storage battery jar having vertical inner walls, a hollow frame adapted to fit into the jar and having a vertical exterior wall extending parallel to and in facial contact with the inner jar wall, a cover plate of less area than the frame, and a marginal flange on the frame and providing a sealing channel closed by the facial contact of the frame and jar walls.

BRUCE FORD.